United States Patent
Hattori et al.

(10) Patent No.: US 7,404,498 B2
(45) Date of Patent: Jul. 29, 2008

(54) FUEL SUPPLY PIPE DEVICE OF FUEL TANK

(75) Inventors: Toshio Hattori, Sagamihara (JP); Takeshi Kojima, Machida (JP)

(73) Assignee: NIFCO Inc., Kanagawa-ken (JP)

( * ) Notice: Subject to any disclaimer, the term of this patent is extended or adjusted under 35 U.S.C. 154(b) by 380 days.

(21) Appl. No.: 11/235,220

(22) Filed: Sep. 27, 2005

(65) Prior Publication Data

US 2006/0065311 A1    Mar. 30, 2006

(30) Foreign Application Priority Data

Sep. 27, 2004   (JP) .............................. 2004-278737

(51) Int. Cl.
*B60K 15/04* (2006.01)
(52) U.S. Cl. .................................... 220/86.3
(58) Field of Classification Search ................ 220/86.1, 220/86.2, 86.3; 137/592
See application file for complete search history.

(56) References Cited

U.S. PATENT DOCUMENTS

| | | | | |
|---|---|---|---|---|
| 1,512,065 A | * | 10/1924 | Taylor | 220/86.3 |
| 1,544,951 A | * | 7/1925 | Sollee | 220/86.3 |
| 1,725,537 A | * | 8/1929 | Parson | 220/86.3 |
| 1,808,245 A | * | 6/1931 | Middleton | 220/86.3 |
| 1,813,554 A | * | 7/1931 | Wickline | 220/86.3 |
| 1,931,335 A | * | 10/1933 | Terry | 220/86.3 |
| 2,371,241 A | * | 3/1945 | Jaffa | 220/86.3 |
| 3,892,330 A | * | 7/1975 | Hotchkiss et al. | 220/86.3 |
| 4,295,577 A | * | 10/1981 | Schmid et al. | 220/86.1 |
| 4,344,544 A | * | 8/1982 | Austin | 220/86.3 |
| 5,085,355 A | * | 2/1992 | Yoshimura et al. | 220/86.1 |
| 5,327,871 A | * | 7/1994 | Gryc | 220/86.3 |
| 5,752,553 A | * | 5/1998 | Kmiecik et al. | 220/86.2 |

FOREIGN PATENT DOCUMENTS

JP          61-122925          8/1986

* cited by examiner

*Primary Examiner*—John Rivell
(74) *Attorney, Agent, or Firm*—Manabu Kanesaka

(57) ABSTRACT

A fuel supply pipe device for a fuel tank of a vehicle includes a fuel supply pipe connected to the fuel tank, and a filler pipe connected to the fuel supply pipe. A hose intrusion preventing member is situated inside the fuel supply pipe. The hose intrusion preventing member includes plural obstructing plates extending parallel to each other following an axial line of the fuel supply pipe, and an annular member attached to the obstructing plates. A metal pipe member is disposed inside the fuel supply pipe adjacent to the hose intrusion preventing member to locate the hose intrusion preventing member inside the fuel supply pipe.

6 Claims, 2 Drawing Sheets

FUEL SUPPLY PIPE DEVICE OF FUEL TANK

BACKGROUND OF THE INVENTION AND RELATED ART STATEMENT

The present invention relates to a fuel supply pipe or device thereof, for a fuel tank, and in particular, it relates to a fuel supply pipe device for a fuel tank having means for preventing improper fuel-siphoning activity.

In the fuel tanks mounted in automobiles, it is known that an intrusion preventing member for preventing intrusion of a vinyl hose is installed, such as in the mid-course of the fuel supply pipe in order to prevent improper fuel-siphoning activity involving insertion of a vinyl hose, or the like, into the tank from the fuel supply port provided on the vehicle body (see Patent Document 1).

Patent Document 1: Japanese Unexamined Utility Model Publication No. S61-122925

However, according to the prior art described in Document 1, a circular plate member having plural fan-shaped holes placed at equal intervals on the same circumference is pressed in and fitted on the inner perimeter surface of the fuel supply pipe. By this, in order to prevent the intrusion of a vinyl hose, the fan-shaped holes must be made smaller than the external dimension of the vinyl hose, and this unavoidably increases the channel resistance of the fuel supply pipe.

Also, because there is a risk that the circular plate member may be deformed and fall off if it is struck strongly by a hard metal rod, it is substantially useless if the fuel supply pipe is bent so that the metal rod cannot reach the circular plate member.

The present invention has been made in order to eliminate the inconveniences of such prior art, and an object of the invention is to provide a fuel supply pipe of a fuel tank having means for preventing fuel siphoning, which is constituted so as to suppress the increase of channel resistance of the fuel supply pipe and is sufficient without restricting the shape of the fuel supply pipe.

SUMMARY OF THE INVENTION

In order to solve such problem, in a first aspect of the present invention, a fuel supply pipe of a fuel tank is connected to a fuel supply port on a vehicle body by means of a filler pipe made of a flexible material. A hose intrusion preventing member is made by bonding plural obstructing plates made of thin plates which extend in parallel to each other following the axial line of that fuel supply pipe on the inner perimeter side of an annular member (base part), and is fitted inside a connection port with the filler pipe. The hose intrusion preventing member is fixed so as not to fall off by fitting a metal short pipe member, of which an end face on the axial line thereof faces opposite an end face in the axial direction of the annular member, on the inner perimeter on the open end side of the connection port.

Also, in a second aspect of the present invention, the outer contour of the plural obstructing plates, which are bonded to the hose intrusion preventing member, is made as a shape approximating a hemispheric surface.

By the structure of the first aspect of the present invention, because the obstructing plates for preventing the intrusion of a hose into the tank in the attempt to improperly siphon the fuel function as flow adjusting plates in the fuel channel, they contribute to suppression of the increase of inflow resistance of the fuel. Also, because a function of preventing falling-off of the hose intrusion preventing member, and a function of suppressing deformation on the open end side of the connection port, are obtained by the metal short pipe member which is fitted on the inner perimeter of the open end side of the connection port, it is effective in increasing the binding strength of the hose band for fastening the filler pipe to the connection port, and in assuring the prevention of falling-off of the hose intrusion preventing member, without incurring an increase of the number of parts.

Also, by the structure of the second aspect, because the outer contour of the obstructing plates is made as an arch shape, and the force is distributed even when it is struck with a metal rod, or the like, the hose intrusion preventing member is made hard to be damaged.

DETAILED DESCRIPTION OF PREFERRED EMBODIMENTS

Herein below, the present invention is explained in detail while reference to the attached drawings.

Figure 1:
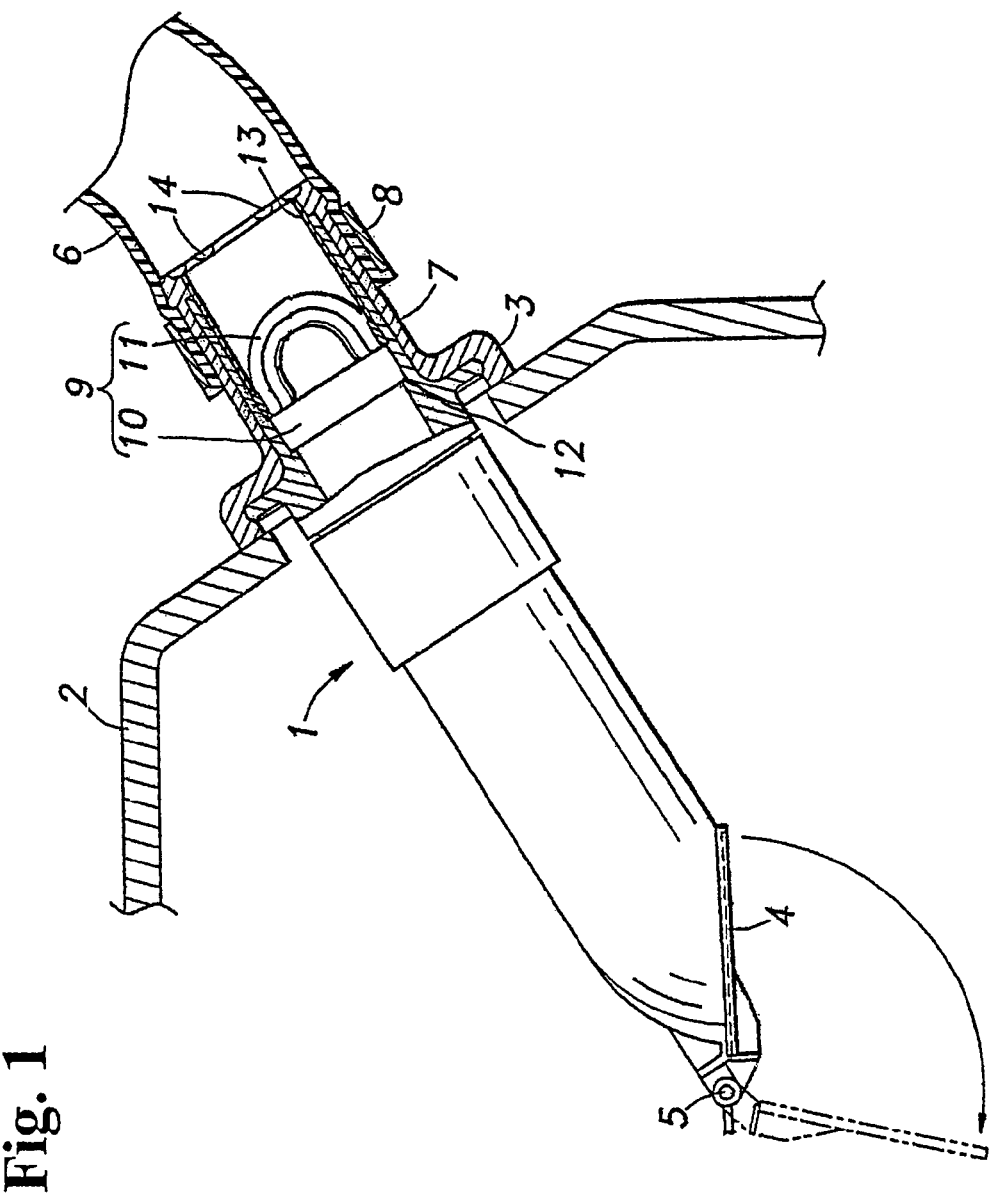
FIG. 1 is a partially cut-away side view showing the device of the present invention.

FIG. 1 shows the surroundings of a fuel supply pipe of a fuel tank to which the present invention is applied. This fuel supply pipe 1 is made of synthetic resin material and has a straight pipe shape overall. A flange part 3 thereof is fixed by welding for example on the outer surface of an upper corner part of a fuel tank 2 made of synthetic resin.

A flap valve 4 for opening and closing the opening on the blow-out side of the fuel supply pipe 1 is provided on the end part of the fuel supply pipe 1 that sticks into the tank 2. This flap valve 4 has one end connected by hinge to the opening of the fuel supply pipe 1 and is normally forced by spring toward the direction of closing the opening by a torsion coil spring (not illustrated) which is installed on the hinge shaft 5. The flap valve 4 is made so as to block the opening so that the fuel inside the tank 2 does not flow back into the fuel supply pipe 1 at a normal time (state shown by solid line in FIG. 1), and to open the opening by the fluid pressure of the fuel in opposition to the springing force of the torsion coil spring when fueling (state shown by imaginary line in FIG. 1).

A connection port 7, to which the lower end part of a filler pipe 6 connected to a fuel inlet port opened outward on the vehicle body is connected, is formed on the upper end of the fuel supply pipe 1. The filler pipe 6 is made of an elastomer material endowed with flexibility, and the lower end part thereof is fastened to the connection port 7 of the fuel supply pipe 1 by a metal hose plate 8.

Figure 2:
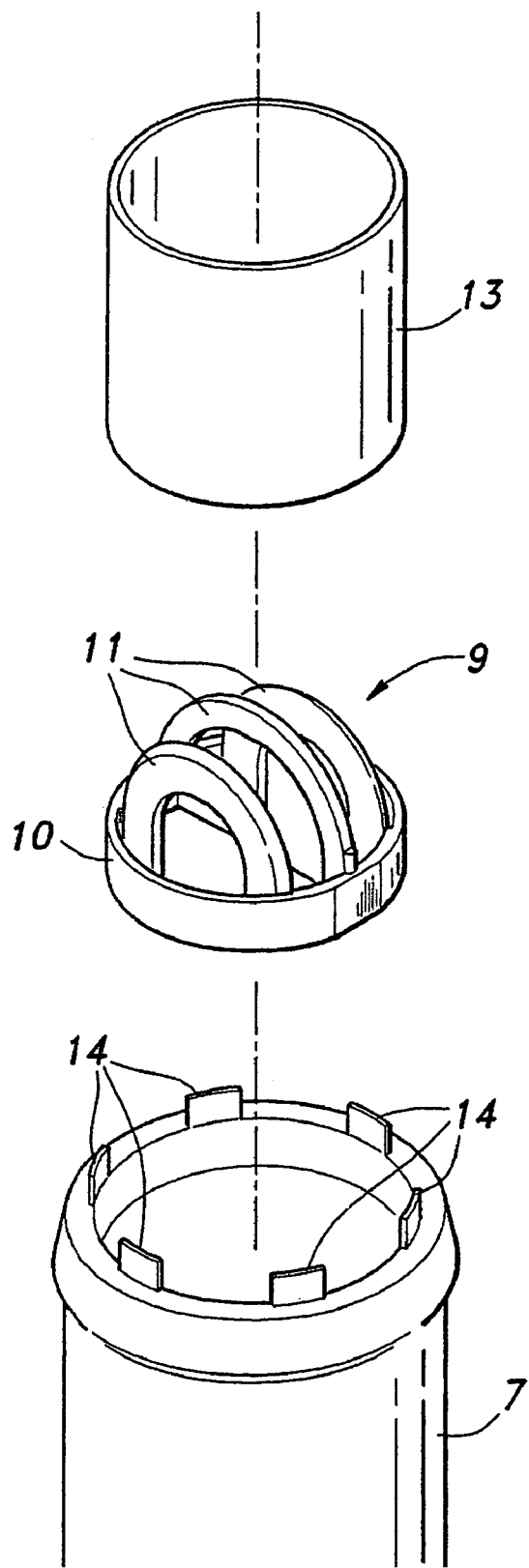
FIG. 2 is an exploded perspective view of the main parts of the present invention.

The connection port, as shown in FIG. 2, has a cylindrical shape, and a hose intrusion preventing member 9 is fitted on an intermediate part on the inside thereof. This hose intrusion preventing member 9 is injection molded with synthetic resin material, and it is formed of an annular base part 10 which is fitted on the inner perimeter surface of the connection port 7, and plural (three in the present working example) arch-shaped obstructing plate parts 11 which are placed to project upward from one end (upper end) in the axial direction of the base part 10.

Here, the plural obstructing plate parts 11 extend parallel to the axial line of the connection port 7 with a suitable distance between each other, and have a shape similar to a hemispheric surface. Also, the hose intrusion preventing member 9 is restricted in position in the axial direction inside the connection port 7 by having the other end (lower end) in the axial direction of the base part 10 fixed to a step part 12 formed on the inner perimeter surface of the connection port 7.

Thus, by making the plural obstructing plate parts 11 extend parallel to the axial line of the connection port 7 with a suitable distance between each other, the obstructing plate parts 11 can be made to serve a function as a flow rectifying or regulating plate in the fuel channel. Also, by making the outer contour of the obstructing plate parts 11 an arch shape (hemispherical shape), when they are struck by a metal rod, or the like, in the attempt to improperly siphon the fuel, that force is distributed to the outer perimeter side, that is, toward the inner perimeter surface of the connection port 7. Also, the hose intrusion preventing member 9 is made hard to be damaged, for example even when the fuel supply pipe 1 is made as a straight pipe. The obstructing plate parts 11 can be made without being constrained in the shape of the fuel supply pipe 1.

A metal short pipe member 13 is fitted on the inner perimeter surface on the open side of the connection port 7. This short pipe member 13 is prevented from falling off from the connection port 7 by heating plural projections 14 formed on the open end of the connection port 7 to make them collapse inward. Also, this short pipe member 13 has the lower end in its axial direction made to face the upper end face in the axial direction of the base part 10 of the hose intrusion preventing member 9, and by the fact that it is prevented from falling off from the connection port 7, it serves also a function of preventing falling-off of the hose intrusion preventing member 9.

By this short pipe member 13, when the filler pipe 6 fitted on the connection port 7 is fastened by the hose band 8, buckling or creep of the connection pipe 7 is suppressed, and the binding strength of the filler pipe 6 is increased.

Thus, a function of preventing falling-off of the hose intrusion preventing member 9 and a function of suppressing deformation on the open end side of the connection port 7 can be obtained by fitting the metal short pipe member 13 on the inner perimeter on the open end side of the connection port 7. Also, reinforcement of the binding strength of the hose band 8 fastening the filler pipe 6 to the connection port 7 and assurance of prevention of falling-off of the hose intrusion preventing member 9 can be simultaneously established without incurring an increase of the number of parts.

The disclosure of Japanese Patent Application No. 2004-278737 filed on Sep. 27, 2004 is incorporated herein.

While the invention has been explained with reference to the specific embodiment of the invention, the explanation is illustrative, and the invention is limited only by the appended claims.

What is claimed is:

1. A fuel supply pipe device for a fuel tank of a vehicle, comprising:
   a fuel supply pipe connected to the fuel tank,
   a filler pipe connected to the fuel supply pipe,
   a hose intrusion preventing member situated inside the fuel supply pipe, and including plural obstructing plates extending only parallel to each other following an axial line of the fuel supply pipe and an annular member attached to the obstructing plates, each of said obstructing plates having a plate shape with an outer contour forming a hemispheric surface at a side of the filler pipe and connected to the annular member at a side opposite to the hemispheric surface, and
   a metal pipe member disposed inside the fuel supply pipe adjacent to the hose intrusion preventing member to locate the hose intrusion preventing member inside the fuel supply pipe.

2. A fuel supply pipe device according to claim 1, wherein said obstructing plates are connected by the annular member only at the side opposite to the hemispheric surface.

3. A fuel supply pipe device according to claim 2, wherein each of said obstructing plates is formed of an annular member with an opening at an inner side thereof.

4. A fuel supply pipe device for a fuel tank of a vehicle, comprising:
   a fuel supply pipe connected to the fuel tank,
   a filler pipe connected to the fuel supply pipe,
   a hose intrusion preventing member situated inside the fuel supply pipe, and including plural obstructing plates extending parallel to each other following an axial line of the fuel supply pipe and an annular member attached to the obstructing plates, each of said obstructing plates having a plate shape and connected to the annular member at one side thereof, and
   a metal pipe member disposed inside the fuel supply pipe adjacent to the hose intrusion preventing member to locate the hose intrusion preventing member inside the fuel supply pipe,
   wherein said obstructing plates have an outer contour forming a hemispheric surface, said fuel supply pipe has a step portion, on which said annular member is placed, and said metal pipe member is disposed on the annular member at a side opposite to the step portion to receive the obstructing plates therein.

5. A fuel supply pipe device according to claim 4, further comprising a band surrounding the filler pipe, fuel supply pipe and metal intrusion preventing member to assemble together.

6. A fuel supply pipe device according to claim 5, further comprising a connecting port to be fixed to the fuel tank, said connecting port being partly disposed between the fuel supply pipe and the filler pipe.

* * * * *